(12) United States Patent
Wang

(10) Patent No.: US 10,114,480 B2
(45) Date of Patent: Oct. 30, 2018

(54) SCREEN CONTENT DISPLAY METHOD AND SYSTEM

(71) Applicant: TENCENT TECHNOLOGY (SHENZHEN) COMPANY LIMITED, Shenzhen (CN)

(72) Inventor: Ling Wang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 75 days.

(21) Appl. No.: 15/246,063

(22) Filed: Aug. 24, 2016

(65) Prior Publication Data

US 2016/0364017 A1  Dec. 15, 2016

Related U.S. Application Data

(63) Continuation of application No. PCT/CN2015/073109, filed on Feb. 15, 2015.

(30) Foreign Application Priority Data

Feb. 24, 2014 (CN) .......................... 2014 1 0063133

(51) Int. Cl.
    *G09G 5/00* (2006.01)
    *G06F 3/0346* (2013.01)
    *G09G 3/20* (2006.01)

(52) U.S. Cl.
    CPC ............. *G06F 3/0346* (2013.01); *G09G 3/20* (2013.01); *G06F 2200/1637* (2013.01);
(Continued)

(58) Field of Classification Search
CPC . G06F 3/0346; G06F 2200/1637; G09G 3/20; G09G 2320/0261; G09G 2340/045; G09G 2340/0492
(Continued)

(56) References Cited

U.S. PATENT DOCUMENTS 6,078,329 A * 6/2000 Umeki .................... G06T 13/40
    345/419
6,480,670 B1 * 11/2002 Hatano ................ H04N 19/105
    348/699
(Continued)

FOREIGN PATENT DOCUMENTS

| CN | 101042848 A | 9/2007 |
|----|-------------|--------|
| CN | 102098373 A | 6/2011 |
| EP | 1837736 A2  | 9/2007 |

OTHER PUBLICATIONS

International Search Report for App. No. PCT/CN2015/073109 dated May 22, 2015.
(Continued)

*Primary Examiner* — Prabodh M Dharia
(74) *Attorney, Agent, or Firm* — Harness, Dickey & Pierce, P.L.C.

(57) ABSTRACT

A screen content display method. The method includes displaying screen content by using a display screen. Motion direction of the display screen on a plane parallel to the display screen and a motion amplitude along the motion direction and detected. The screen content is offset in an opposite direction of the motion direction of the display screen according to the motion amplitude of the display screen.

13 Claims, 6 Drawing Sheets

(52) U.S. Cl.
CPC ............... *G09G 2320/0261* (2013.01); *G09G 2340/045* (2013.01); *G09G 2340/0492* (2013.01)

(58) Field of Classification Search
USPC ................ 345/1.3, 156–173, 671, 684; 1/1; 715/711
See application file for complete search history.

(56) References Cited

U.S. PATENT DOCUMENTS

| | | | | |
|---|---|---|---|---|
| 6,874,126 | B1* | 3/2005 | Lapidous | G06F 3/0481 |
| | | | | 715/711 |
| 7,130,443 | B1* | 10/2006 | Werner | H04N 19/467 |
| | | | | 382/100 |
| 7,629,987 | B1* | 12/2009 | De Waal | G06F 3/14 |
| | | | | 345/158 |
| 9,086,756 | B2* | 7/2015 | Schon | G06F 3/0485 |
| 2002/0186189 | A1* | 12/2002 | Ilcisin | G02F 1/1309 |
| | | | | 345/87 |
| 2004/0024295 | A1* | 2/2004 | Cook | A61B 5/0059 |
| | | | | 600/310 |
| 2007/0080940 | A1* | 4/2007 | Aoki | G06F 3/0308 |
| | | | | 345/158 |
| 2007/0128899 | A1* | 6/2007 | Mayer | G06F 9/4406 |
| | | | | 439/152 |
| 2007/0210984 | A1* | 9/2007 | Choi | G09G 5/006 |
| | | | | 345/3.1 |
| 2008/0266328 | A1* | 10/2008 | Fong | G06F 1/1626 |
| | | | | 345/684 |
| 2010/0037184 | A1 | 2/2010 | Sie | |
| 2010/0066696 | A1* | 3/2010 | Yang | G06F 1/3231 |
| | | | | 345/173 |
| 2013/0184064 | A1* | 7/2013 | Manning | G07F 17/3211 |
| | | | | 463/25 |
| 2014/0013437 | A1* | 1/2014 | Anderson | G06F 21/84 |
| | | | | 726/26 |
| 2014/0240264 | A1* | 8/2014 | Im | G06F 1/1652 |
| | | | | 345/173 |
| 2014/0285507 | A1* | 9/2014 | Sato | G06F 3/04883 |
| | | | | 345/582 |
| 2014/0320434 | A1* | 10/2014 | Pantel | G06F 3/017 |
| | | | | 345/173 |
| 2015/0077437 | A1* | 3/2015 | Yin | G06F 3/03 |
| | | | | 345/671 |
| 2015/0130685 | A1* | 5/2015 | Kim | G06F 3/147 |
| | | | | 345/3.1 |
| 2016/0189351 | A1* | 6/2016 | Holz | G06F 1/163 |
| | | | | 345/647 |

OTHER PUBLICATIONS

International Preliminary Report for App. No. PCT/CN2015/073109 dated Aug. 30, 2016.

\* cited by examiner

SCREEN CONTENT DISPLAY METHOD AND SYSTEM

CROSS-REFERENCE TO RELATED APPLICATIONS

This application is a continuation of International Application No. PCT/CN2015/073109, filed Feb. 15, 2015. This application claims the benefit and priority of Chinese Application No. 201410063133.3, filed Feb. 24, 2014. The entire disclosures of each of the above applications are incorporated herein by reference.

FIELD

The present disclosure relates to the field of computer technologies, and in particular, to a screen content display method and system.

BACKGROUND

This section provides background information related to the present disclosure which is not necessarily prior art.

With the popularity of mobile terminals, such as portable notebook computers and mobile phones, the probability that a user reads a file or browses a web page in an unstable environment (for example, in a vehicle) by using the mobile terminal is gradually increasing. However, reading in an unstable environment, for example, in a vehicle, by using a mobile terminal, may cause injury to a user's eyes, as the screen content on the mobile terminal may become blurry due to the continuous sway of the mobile terminal, and the screen content on the mobile terminal cannot be identified clearly.

SUMMARY

This section provides a general summary of the disclosure, and is not a comprehensive disclosure of its full scope or all of its features.

In view of this, for the challenge that human eyes cannot identify screen content due to the sway of a terminal, it is necessary to provide a screen content display method and system.

A screen content display method is provided, including:
displaying screen content by using a display screen;
detecting a motion direction of the display screen on a plane parallel to the display screen and a motion amplitude along the motion direction; and
offsetting the screen content in an opposite direction of the motion direction of the display screen according to the motion amplitude of the display screen.

A screen content display system is provided, including:
a display module, configured to display screen content by using a display screen;
a motion detection module, configured to detect a motion direction of the display screen on a plane parallel to the display screen and a motion amplitude along the motion direction; and
a content offset module, configured to offset the screen content in an opposite direction of the motion direction of the display screen according to the motion amplitude of the display screen.

According to the screen content display method and system, a motion direction of a display screen on a plane parallel to the display screen and a motion amplitude are detected, and screen content is offset in an opposite direction of the motion direction of the display screen according to the motion amplitude of the display screen, which thereby relieves and even offsets motion of the screen content caused by motion of the display screen itself, so that screen content seen by human eyes basically maintains at a fixed location, and the human eyes can accurately identify the screen content.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In order to make the technical methods and benefits of the present disclosure more comprehensible, the present disclosure is described in further detail below with reference to the accompanying drawings and embodiments. It should be understood that embodiments described herein are merely used for explaining the present disclosure, and are not intended to limit the present disclosure.

Unless the context clearly indicates otherwise, singular elements or components in the present disclosure may be in the plural and vice versa, which is not limited in the present disclosure. Although blocks in the present disclosure are labeled with numbers, such numbers are not intended to limit the order of these blocks. Unless the order of blocks is explicitly stated or it is explicitly stated that a block needs to be performed on the basis of another block, the relative order of blocks can be adjusted. It should be understood that as used herein, the term "and/or" involves and includes any and all combinations of one or more of the associated listed items.

Figure 1:
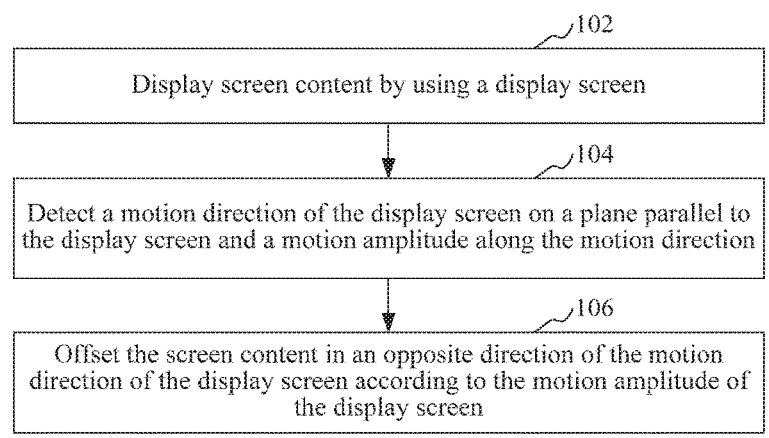
FIG. 1 is a flowchart of a screen content display method according to various embodiments.

As shown in FIG. 1, according to various embodiments, a screen content display method is provided, and the method includes the following.

Block 102: Display screen content by using a display screen. A terminal displays screen content by using a display screen of the terminal. The terminal may be any electronic device having a display screen, and the terminal may include, but is not limited to, a smart phone, a tablet computer, a personal digital assistant, an ebook reader, an MP3 or MP4 player, a POS terminal, a vehicle-mounted computer, a laptop portable computer, and the like. The terminal displays the screen content by using the display screen, and the screen content may be any visual element, such as a character, an image, and a program interface.

Block 104: Detect a motion direction of the display screen on a plane parallel to the display screen and a motion amplitude along the motion direction. The terminal is integrated with the display screen, the display screen moves together with the terminal, and motion of the display screen keeps consistent with motion of the terminal. Translation of the display screen on the plane parallel to the display screen is an important factor resulting in the inability to identify the screen content, and therefore, the motion direction of the display screen on the plane parallel to the display screen and the motion amplitude along the motion direction need to be detected. It may be understood to one with ordinary skill in the art that the terminal may randomly move in space. In this case, only a motion direction component and a motion amplitude component of the terminal on the plane parallel to the display screen need to be detected.

The terminal may detect the motion direction and the motion amplitude of the display screen by using a sensor used for motion detection, such as an acceleration sensor, a gravity sensor, or a gyroscope. According to various embodiments, block 104 includes operation 11) to operation 12):

Operation 11): Collect acceleration data of the display screen by using the sensor. Using the acceleration sensor as an example, the acceleration sensor uses a feature where crystal deformation exists in an internal chip of the acceleration sensor due to acceleration, such deformation generates a voltage, and the acceleration data of the display screen can be detected according to a correspondence between a preset voltage and the acceleration.

The sensor of the terminal collects the acceleration data every one preset time period, and may obtain, by intercepting a sensor event, the acceleration data collected by the sensor. The sensor may collect the acceleration data in three dimensions, which are an X axis, a Y axis, and a Z axis, where the X axis is perpendicular to the Y axis, a plane that is formed by the X axis and the Y axis is correspondingly parallel to the plane of the display screen, the Z axis is perpendicular to the plane that is formed by the X axis and the Y axis.

Operation 12): Determine the motion direction of the display screen on the plane parallel to the display screen and the motion amplitude along the motion direction according to the acceleration data. Motion of the display screen on the plane parallel to the display screen corresponds to the acceleration data, which is detected by the sensor, of the X axis and the Y axis, and the terminal may determine the motion direction of the display screen on the plane parallel to the display screen and the motion amplitude along the motion direction by using the acceleration data, which is collected by using the sensor, of the X axis and the Y axis. The motion direction of the display screen on the plane parallel to the display screen may be indicated by using a direction of a sum of vectors of the acceleration data, which is collected by the sensor, of the X axis and the Y axis. The terminal may determine the motion amplitude of the display screen along the motion direction according to a change situation of multiple pieces of the acceleration data and with reference to a preset physical formula function of acceleration and a motion displacement.

According to various embodiments, by following operation 11) to operation 12), the terminal collects the acceleration data of the display screen by using the sensor, so that the motion direction and the motion amplitude of the display screen can be determined according to the collected acceleration data. Because many terminals, such as smart phones and tablet computers, presently have a built-in sensor used for motion detection, various embodiments of the present disclosure can be implemented by using an existing hardware resource of the terminal, and implementation costs are low.

Block 106: Offset the screen content in an opposite direction of the motion direction of the display screen according to the motion amplitude of the display screen. The terminal offsets the screen content in the opposite direction of the motion direction of the display screen, and an offset distance is related to the motion amplitude of the display screen. After the terminal offsets the screen content, a part, which exceeds a display area of the display screen, in the offset screen content is not displayed, and an extra part, which is generated due to offsetting, in the offset screen content may be compensated by using a preset color, a color related to the screen content, or an image related to the screen content.

According to various embodiments, the offset distance of the screen content is equal to the motion amplitude of the display screen. In various embodiments, the screen content is offset in the opposite direction of the motion direction of the display screen, and the offset distance of the content is equal to the motion amplitude of the display screen, which may offset the motion of the display screen, so that screen content seen by human eyes is static, and the human eyes can conveniently identify the screen content of the terminal.

Figure 2:
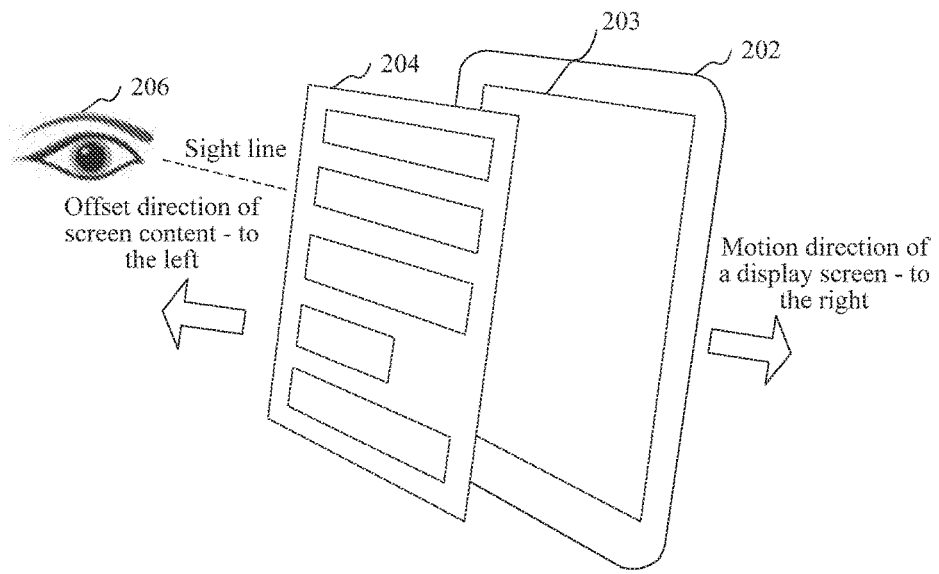
FIG. 2 is a diagram of a relationship between a motion direction of a display screen and an offset direction of screen content according to various embodiments.
Figure 3:
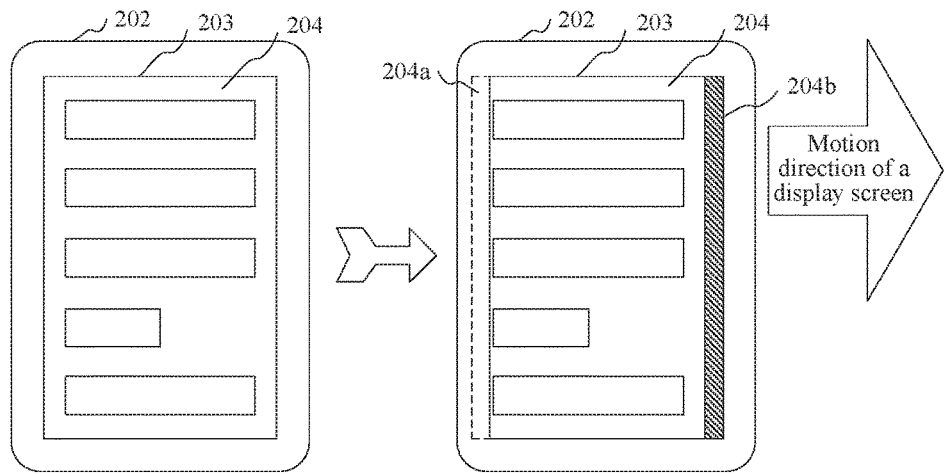
FIG. 3 is a diagram of offsetting screen content in an opposite direction of a motion direction of a display screen according to a motion amplitude of the display screen according to various embodiments.

For example, as shown in FIG. 2, if a terminal 202 detects that a display screen 203 moves to the right, the terminal 202 offsets screen content 204 to the left. In this method, an offset direction of the content 204 is opposite to a motion direction of the display screen 203, and therefore, motion of the screen content 204 together with the display screen 203 may be relieved. When an offset distance of the screen content 204 is equal to a motion amplitude of the display screen 203, motion of the display screen 203 may be offset. In this way, a motion, relative to human eyes 206, of the screen content 204 is very small or the screen content 204 relative to human eyes 206 basically remains still, so that the human eyes can identify the screen content on the display screen 203. With reference to FIG. 3, the left figure in FIG. 3 is a front view of the terminal 202 before the display screen 203 in FIG. 2 moves to the right, and the right figure in FIG. 3 is a front view of the terminal 202 when the display screen 203 in FIG. 2 moves to the right. It can be seen from FIG. 3 that, after the screen content 204 is offset, a part 204a (a dashed part) exceeding a display area of the display screen is not displayed, and therefore, an extra part 204b (a shadow part) which is generated due to offsetting may be filled by using a color the same as a background color of the screen content 204 or by using the white color.

According to the screen content display method, a motion direction and a motion amplitude of a display screen on a plane parallel to the display screen are detected, and screen content is offset in an opposite direction of the motion direction of the display screen according to the motion amplitude of the display screen, which thereby relieves and even offsets sway of the screen content caused by motion of the display screen, so that screen content seen by human eyes basically maintains at a fixed location, and the human eyes can accurately identify the screen content.

Figure 4:
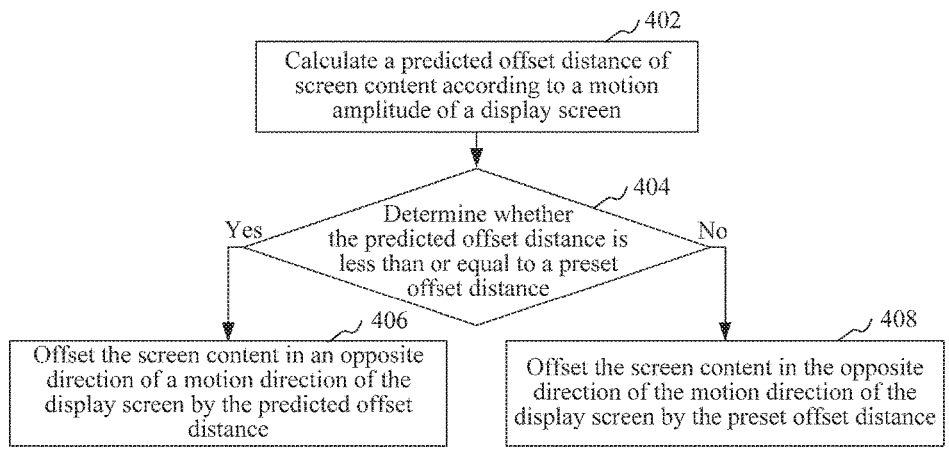
FIG. 4 is a flowchart offsetting screen content in an opposite direction of a motion direction of a display screen according to a motion amplitude of the display screen according to various embodiments.

As shown in FIG. 4, according to various embodiments, block 106 includes the following.

Block 402: Calculate a predicted offset distance of the screen content according to the motion amplitude of the display screen. The terminal may calculate a product of the motion amplitude of the display screen and a preset proportionality coefficient, and use the product as the predicted offset distance, or may directly use the motion amplitude of the screen content as the predicted offset distance of the screen content. The predicted offset distance refers to a distance that is obtained through calculation and by which the screen content should be offset to relieve or offset the motion of the display screen.

Block 404: Determine whether the predicted offset distance is less than or equal to a preset offset distance, and if yes, perform block 406 or, if not, perform block 408. When the motion amplitude of the display screen is excessively large, if the screen content is still offset by the predicted offset distance, a part of useful information cannot be displayed due to excessive offset of the screen content. Therefore, the terminal may pre-store the preset offset distance as a threshold and then perform different operations by determining whether the predicted offset distance exceeds the threshold, namely, the preset offset distance.

Block 406: Offset the screen content in the opposite direction of the motion direction of the display screen by the predicted offset distance. In this case, because the motion amplitude of the display screen is within a reasonable range, the predicted offset distance obtained through calculation is less than or equal to the preset offset distance, and the terminal may directly offset the screen content in the opposite direction of the motion direction of the display screen by the predicted offset distance, so as to effectively relieve or offset that the screen content cannot be identified due to the motion of the display screen.

Block 408: Offset the screen content in the opposite direction of the motion direction of the display screen by the preset offset distance. In this case, because the motion amplitude of the display screen is excessively large and exceeds the reasonable range, the predicted offset distance obtained through calculation is greater than the preset offset distance. If the screen content is still offset by the predicted offset distance, a part of useful information cannot be displayed due to excessive offset of the screen content.

Therefore, the terminal may offset the screen content in the opposite direction of the motion direction of the display screen by the preset offset distance, which can not only relieve, to some extent, that the screen content cannot be identified due to the motion of the display screen, but also can enable the terminal to display complete screen content to the greatest extent.

According to various embodiments of block 402 to block 408, a terminal calculates a predicted offset distance, determines a relationship between values of the predicted offset distance and a preset offset distance, and uses different offset distances according to a determining result, to offset screen content, so that an offset distance of the screen content maintains within a reasonable range, which can not only ensure that the terminal displays complete screen content, but can also enable a user to identify the screen content.

According to various embodiments, the screen content display method further includes a rotation control block of the screen content, and includes operation 21) to operation 22):

Operation 21): Detect a rotation direction and a rotation angle of the display screen on the plane parallel to the display screen. On the plane parallel to the display screen, the display screen (and the terminal) not only makes a translational motion, but also rotates. It may be understood by one with ordinary skill in the art that the terminal may randomly rotate in space, and in this case, can detect a rotation direction component and a rotation angle component of the display screen on the plane parallel to the display screen. When the terminal rotates, there are differences among motion directions and motion accelerations of various parts of the terminal, and therefore, acceleration data at different parts of the terminal can be acquired by using a sensor, so as to determine rotation directions and rotation angles of the terminal and the display screen on the plane parallel to the display screen according to the acquired acceleration data.

Operation 22): Rotate the screen content in an opposite direction of the rotation direction of the display screen according to the rotation angle of the display screen. The terminal rotates the whole screen content to the opposite direction of the rotation direction of the display screen, where a rotation center of the screen content corresponds to a rotation center of the display screen, and a rotation angle of the screen content is related to the rotation angle of the display screen. After the terminal rotates the screen content, a part, which exceeds a display area of the display screen, in the rotated screen content is not displayed, and an extra part, which is generated due to rotation, in the rotated screen content may be compensated by using a preset color, a color related to the screen content, or an image related to the screen content.

According to various embodiments, the rotation angle of the screen content is equal to the rotation angle of the display screen. According to various embodiments, the screen content is rotated in the opposite direction of the rotation direction of the display screen, and the rotation angle of the content is equal to the rotation angle of the display screen, which can offset motion of the display screen, so that screen content seen by human eyes is static, and the human eyes can conveniently identify the screen content of the terminal.

Figure 5:
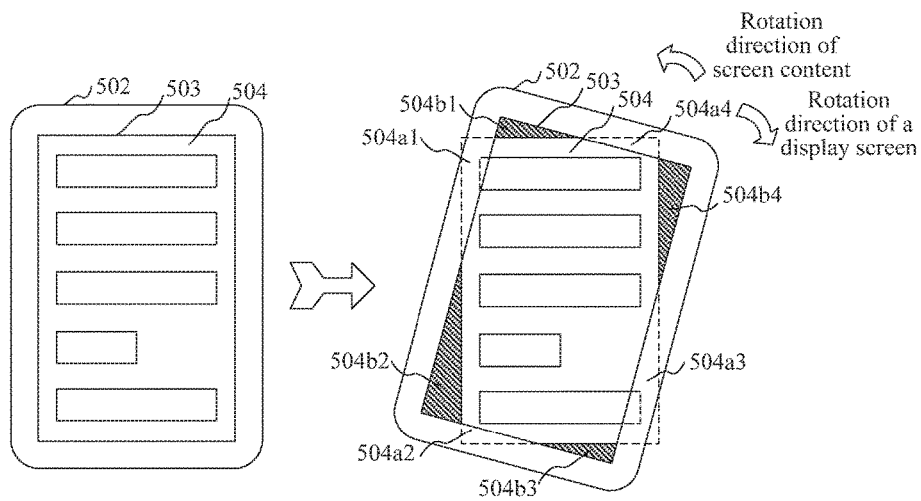
FIG. 5 is a diagram of rotating screen content in an opposite direction of a rotation direction of a display screen according to a rotation angle of the display screen according to various embodiments.

For example, as shown in FIG. 5, a terminal 502 is originally shown in the left figure of FIG. 5. In the right figure of FIG. 5, if the terminal 502 detects that a display screen 503 is rotated clockwise, the terminal rotates the screen content 504 counterclockwise, which may enable the screen content 504 to move together with the display screen 503, and especially when a rotation angle of the screen content 504 is equal to a rotation angle of the display screen 503, may offset the rotation of the display screen 503. In this way, the rotation, relative to human eyes, of the screen content 504 is very small or the screen content 204 relative to human eyes 206 basically remains still, so that human eyes can identify the screen content of the terminal. It can be seen from the right figure in FIG. 5 that, after the screen content 504 is rotated, a part 504a1 to 504a4 (a dashed part) exceeding a display area of the display screen is not displayed, and an extra part 504b1 to 504b4 (a shadow part) generated due to rotation may be filled by using a color the same as a background color of the screen content 504 or by using the white color.

According to various embodiments, by following operation 21) to operation 22), a terminal detects a rotation direction and a rotation angle of a display screen on a plane parallel to the display screen, and screen content of the terminal is rotated in an opposite direction of the rotation direction of the display screen according to the rotation angle of the display screen, which thereby lessens and even offsets rotation of the screen content caused by rotation of the display screen itself, so that screen content seen by human eyes basically maintains at a fixed location, and human eyes can accurately identify the screen content.

Figure 6:
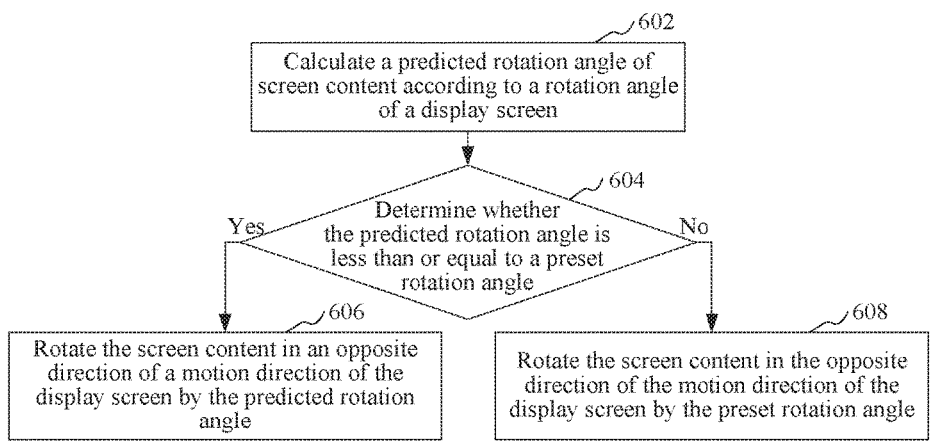
FIG. 6 is a flowchart of rotating screen content in an opposite direction of a rotation direction of a display screen according to a rotation angle of the display screen according to various embodiments.

As shown in FIG. 6, according to various embodiments, operation 22) includes the following.

Block 602: Calculate a predicted rotation angle of the screen content according to the rotation angle of the display screen. The terminal may calculate a product of the rotation angle of the display screen and a preset proportionality coefficient and use the product as the predicted rotation angle of the screen content, or may directly use the rotation angle of the display screen as the predicted rotation angle of the screen content. The predicted rotation angle refers to an angle that is obtained through calculation and at which the screen content of the terminal should be rotated to relieve or offset sway of the screen content caused by motion of the display screen.

Block 604: Determine whether the predicted rotation angle is less than or equal to a preset rotation angle and, if yes, perform block 606 or, if not, perform block 608. When the rotation angle of the display screen is excessively large, if the screen content is still rotated at the predicted rotation angle, a part of useful information cannot be displayed due to excessive rotation of the screen content. Therefore, the terminal may pre-store the preset rotation angle as a threshold, and then perform different operations by determining whether the predicted rotation angle exceeds the threshold, namely, the preset rotation angle.

Block 606: Rotate the screen content in the opposite direction of the motion direction of the display screen at the predicted rotation angle. In this case, because the rotation angle of the display screen is within a reasonable range, the predicted rotation angle obtained through calculation is less than or equal to the preset rotation angle, and the terminal may directly rotate the screen content in the opposite direction of the rotation direction of the display screen at the predicted rotation angle, so as to effectively relieve or offset that the screen content cannot be identified due to the rotation of the display screen.

Block 608: Rotate the screen content in the opposite direction of the motion direction of the display screen at the preset rotation angle. In this case, because the rotation angle of the display screen is excessively large and exceeds the reasonable range, the predicted rotation angle obtained through calculation is greater than the preset rotation angle. If the screen content is still rotated at the predicted rotation angle, a part of useful information cannot be displayed due to excessive rotation of the screen content. Therefore, the terminal may limit the rotation angle of the screen content to the preset rotation angle, which thereby can not only relieve, to some extent, that the screen content cannot be identified due to the rotation of the display screen, but also enable the terminal to display complete screen content to the greatest extent.

According to various embodiments, by following block 602 to block 608, a terminal calculates a predicted rotation angle, determines a relationship between values of the predicted rotation angle and the preset rotation angle, and uses different rotation angles according to a determining result, to rotate screen content, so that a rotation angle of the screen content maintains within a reasonable range, which can not only ensure that the terminal displays complete screen content, but can also enable a user to identify the screen content.

According to various embodiments, the screen content display method further includes block of zooming out of or in on the screen content, and includes operation 31) to operation 32):

Operation 31): Detect a displacement direction and a displacement amplitude of the display screen in a direction perpendicular to the display screen. The displacement direction (hereinafter briefly referred to as "a longitudinal direction") of the display screen in the direction perpendicular to the display screen includes a displacement of the display screen along a direction that is perpendicular to the display screen and is the same as a light emitting direction of the display screen, or a displacement of the display screen along a direction that is perpendicular to the display screen and is an opposite direction of a light emitting direction of the display screen. The displacement amplitude is an amplitude of the displacement of the display screen along the displacement direction in the direction perpendicular to the display screen.

Operation 32): Zoom out of or zoom in on the screen content according to the displacement direction and the displacement amplitude of the display screen. When the display screen makes a displacement along the direction (that is, a direction towards a user) that is perpendicular to the display screen and is the same as the light emitting direction of the display screen, the terminal may zoom out of the screen content. On the contrary, when the display screen makes a displacement along the direction (that is, a direction away from the user) that is perpendicular to the display screen and is opposite to the light emitting direction of the display screen, the terminal may zoom in on the screen content. When the display screen stops making a displacement in the direction perpendicular to the display screen, the screen content that is zoomed out of or zoomed in on can be recovered to an original ratio.

According to various embodiments, by following block 31) to block 32), the screen content is zoomed out of or zoomed in on according to a longitudinal displacement direction and displacement amplitude of the display screen, so as to ensure that a size of screen content seen by human eyes basically remains unchanged when a longitudinal displacement is performed on the display screen, thereby avoiding unstableness of a size of the screen content caused by repeated longitudinal displacements of the display screen.

Figure 7:
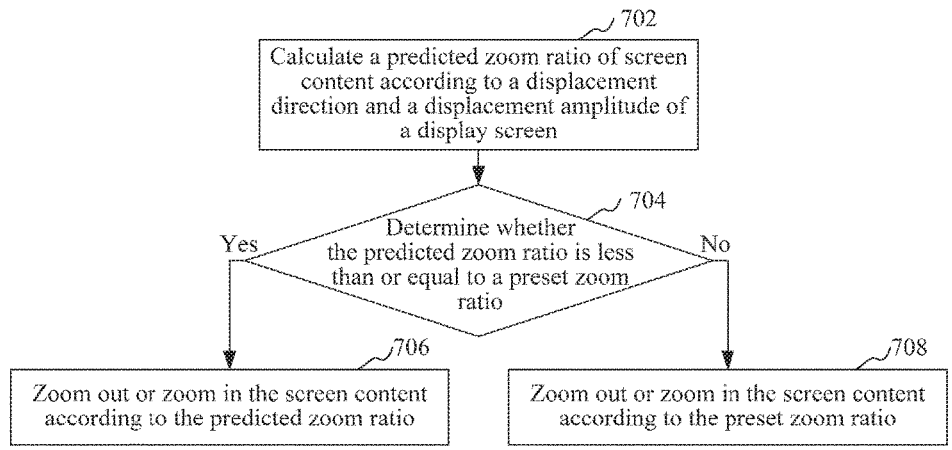
FIG. 7 is a flowchart of zooming out of or zooming in on screen content according to a displacement direction and a displacement amplitude of a display screen according to various embodiments.

As shown in FIG. 7, according to various embodiments, operation 32) includes the following.

Block 702: Calculate a predicted zoom ratio of the screen content according to the displacement direction and the displacement amplitude of the display screen. The terminal may determine the predicted zoom ratio of the screen content according to a preset correspondence among the displacement direction and displacement amplitude of the display screen and a zoom ratio of the screen content. The predicted zoom ratio refers to a ratio at which the screen content should be zoomed in on or zoomed out of to relieve or offset a size change of the screen content caused by the longitudinal displacement of the display screen.

Block 704: Determine whether the predicted zoom ratio is less than or equal to a preset zoom ratio and, if yes, perform block 406 or, if not, perform block 408. When the longitudinal displacement of the display screen is excessively large, if the screen content is still zoomed out or zoomed in according to the predicted zoom ratio, the zoom ratio of the screen content is imbalanced, so that zoom out of or zoom in on the screen content exceeds a reasonable range, and useful information cannot be displayed; therefore, the terminal may pre-store the preset zoom ratio as a threshold, and then perform different operations by determining whether the predicted zoom ratio exceeds the threshold, namely, the preset zoom ratio.

Block 706: Zoom out of or zoom in on the screen content according to the predicted zoom ratio. In this case, the predicted zoom ratio is less than or equal to the preset zoom ratio, indicating that the predicted zoom ratio is within the reasonable range, and the terminal may zoom out of or zoom in on the whole screen content according to the predicted zoom ratio.

Block 708: Zoom out of or zoom in on the screen content according to the preset zoom ratio. In this case, the predicted zoom ratio is greater than the preset zoom ratio, indicating that the predicted zoom ratio exceeds the reasonable range, and the terminal may zoom out of or zoom in on the whole screen content according to the preset zoom ratio.

According to various embodiments, by following block 702 to block 708, a terminal calculates a predicted zoom ratio of screen content, determines a relationship between values of the predicted zoom ratio and a preset zoom ratio, and uses different zoom ratios according to a determining result, to zoom out of or zoom in on the screen content, so that a zoom ratio of the screen content maintains within a reasonable range, which can not only ensure that complete screen content is displayed, but can also avoid instability of a size of the screen content due to repeated longitudinal displacements of a display screen.

A principle of the screen content display method is described below by providing scenario non-limiting example.

A terminal displays screen content by using a display screen, and the terminal intercepts a gravity sensor event, so as to detect a motion direction of the display screen on a plane parallel to the display screen and a motion amplitude along the motion direction. When the terminal detects that the display screen moves to the left on the plane parallel to the display screen and acquires a motion amplitude for the display screen moving to the left, the terminal controls the screen content to offset to the right, and an offset distance of the screen content is equal to the motion amplitude of the display screen. When the terminal further detects that the display screen moves to the right and acquires a motion amplitude for the display screen moving to the right, the terminal then controls the screen content to offset to the left, and an offset distance of the screen content is equal to the motion amplitude of the display screen. In this way, the display screen continuously makes a left-right sway, the screen content sways in an opposite direction of the display screen, and, eventually, screen content seen by human eyes basically remains still.

When the terminal further detects, by using a direction sensor, that the display screen itself rotates counterclockwise, the terminal controls the screen content to rotate clockwise by using a rotation center of the display screen as a center. When the terminal further detects, by using the direction sensor, that the display screen itself rotates clockwise, the terminal then controls the screen content to rotate counterclockwise by using the rotation center of the display screen as the center. In this way, in a process in which the display screen continuously makes a left-right rotation, the screen content basically remains still relative to human eyes.

The terminal further detects, by using a gravity sensor, that the display screen makes a displacement along a direction that is perpendicular to the display screen and is the same as a light emitting direction of the display screen, and the terminal may zoom out the screen content according to a ratio. The terminal then further detects that the display screen makes a displacement along a direction that is perpendicular to the display screen and is opposite to the light emitting direction of the display screen, and the terminal may zoom in on the screen content according to a ratio. In this way, in a process of repeated longitudinal displacements of the display screen, a size of screen content seen by human eyes basically remains unchanged.

Figure 8:
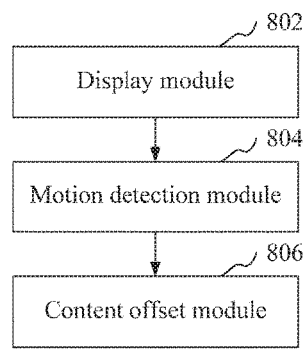
FIG. 8 is a block diagram of a screen content display system according to various embodiments.

As shown in FIG. 8, according to various embodiments, a screen content display system is provided and includes a display module 802, a motion detection module 804, and a content offset module 806.

The display module 802 is configured to display screen content by using a display screen. The screen content may be any visual element, such as a character, an image, and a program interface. The motion detection module 804 is configured to detect a motion direction of the display screen on a plane parallel to the display screen and a motion amplitude along the motion direction. The motion detection module 804 may be configured to detect the motion direction and the motion amplitude of the display screen by using a sensor used for motion detection, such as an acceleration sensor, a gravity sensor, or a gyroscope. The display screen may randomly move in space, and in this case, the motion detection module 804 may be configured to detect a motion direction component and a motion amplitude component of the display screen on the plane parallel to the display screen.

The content offset module 806 is configured to offset the screen content in an opposite direction of the motion direction of the display screen according to the motion amplitude of the display screen. The content offset module 806 may be configured to instantly offset the whole screen content in the opposite direction of the motion direction of the display screen, and an offset distance is related to the motion amplitude of the display screen. The content offset module 806 is configured to, after offsetting the screen content, skip displaying a part, which exceeds a display area of the display screen, in the offset screen content, and compensate an extra part, which is generated due to the offset, in the offset screen content by using a preset color, a color related to the screen content, or an image related to the screen content.

According to various embodiments, the offset distance of the screen content is equal to the motion amplitude of the display screen. In various embodiments, the screen content is offset in the opposite direction of the motion direction of the display screen, and the offset distance of the content is equal to the motion amplitude of the display screen, which can offset motion of the display screen, so that screen content seen by human eyes is static, and human eyes can conveniently identify the screen content.

According to the screen content display system, a motion direction and a motion amplitude of a display screen on a plane parallel to the display screen are detected, and screen content is offset in an opposite direction of the motion direction of the display screen according to the motion amplitude of the display screen, which thereby relieves and even offsets sway of the screen content caused by motion of the display screen, so that screen content seen by human eyes basically maintains at a fixed location, and the human eyes can accurately identify the screen content.

Figure 9:
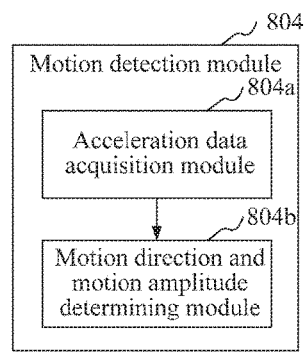
FIG. 9 is a block diagram of a motion detection module in FIG. 8 according to various embodiments.

As shown in FIG. 9, according to various embodiments, the motion detection module 804 includes an acceleration data acquisition module 804a and a motion direction and motion amplitude determining module 804b.

The acceleration data acquisition module 804a is configured to collect acceleration data of the display screen by using the sensor. The acceleration data acquisition module 804a may be configured to collect the acceleration data every one preset time period by using the sensor. The acceleration data acquisition module 804a may be configured to obtain, by intercepting a sensor event, the acceleration data collected by the sensor. The sensor may collect the acceleration data in three dimensions, which are an X axis, a Y axis, and a Z axis, where the X axis is perpendicular to the Y axis, a plane that is formed by the X axis and the Y axis is correspondingly parallel to the plane of the display screen, the Z axis is perpendicular to the plane that is formed by the X axis and the Y axis.

The motion direction and motion amplitude determining module 804b is configured to determine the motion direction of the display screen on the plane parallel to the display screen and the motion amplitude along the motion direction according to the acceleration data. Motion of the display screen on the plane parallel to the display screen corresponds to the acceleration data, which is detected by the sensor, of the X axis and the Y axis, and the motion direction and motion amplitude determining module 804b may be configured to determine the motion direction of the display screen on the plane parallel to the display screen and the motion amplitude along the motion direction according to the acceleration data, which is collected by using the sensor, of the X axis and the Y axis. The motion direction of the display screen on the plane parallel to the display screen may be indicated by using a direction of a sum of vectors of the acceleration data, which is collected by the sensor, of the X axis and the Y axis. The motion direction and motion amplitude determining module 804b may be configured to determine the motion amplitude of the display screen along the motion direction according to a change situation of multiple pieces of the acceleration data and with reference to a preset physical formula function of acceleration and a motion displacement.

According to various embodiments, acceleration data of a display screen is collected by using a sensor, so that a motion direction and a motion amplitude of the display screen may be determined according to the collected acceleration data. Because many terminals, such as smart phones and tablet computers, presently have a built-in sensor used for motion detection, various embodiments of the present disclosure may be implemented by using an existing hardware resource of a terminal, and implementation costs are low.

Figure 10:
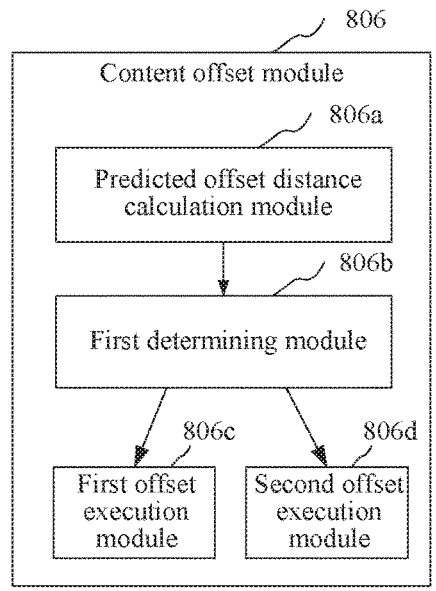
FIG. 10 is a block diagram of a content offset module in FIG. 8 according to various embodiments.

As shown in FIG. 10, according to various embodiments, the content offset module 806 includes a predicted offset distance calculation module 806a, a first determining module 806b, a first offset execution module 806c, and a second offset execution module 806d.

The predicted offset distance calculation module 806a is configured to calculate a predicted offset distance of the screen content according to the motion amplitude of the display screen. The predicted offset distance calculation module 806a may be configured to calculate a product of the motion amplitude of the display screen and a preset proportionality coefficient, and use the product as the predicted offset distance of the screen content, or may directly use the motion amplitude of the screen content as the predicted offset distance of the screen content. The predicted offset distance refers to a distance that is obtained through calculation and by which the screen content should be offset to relieve or offset the motion of the display screen.

The first determining module 806b is configured to determine whether the predicted offset distance is less than or equal to a preset offset distance. When the motion amplitude of the display screen is excessively large, if the screen content is still offset by the predicted offset distance, a part of useful information cannot be displayed due to excessive offset of the screen content. Therefore, the preset offset distance may be pre-stored as a threshold, and then, different operations are performed by determining whether the predicted offset distance exceeds the threshold, namely, the preset offset distance.

The first offset execution module 806c is configured to, if the predicted offset distance is less than or equal to the preset offset distance, offset the screen content in the opposite direction of the motion direction of the display screen by the predicted offset distance. In this case, because the motion amplitude of the display screen is within a reasonable range, the predicted offset distance obtained through calculation is less than or equal to the preset offset distance, and the first offset execution module 806c may be configured to directly offset the screen content in the opposite direction of the motion direction of the display screen by the predicted offset distance, so as to effectively relieve or offset that the screen content cannot be identified due to the motion of the display screen.

The second offset execution module 806d is configured to, if the predicted offset distance is greater than the preset offset distance, offset the screen content in the opposite direction of the motion direction of the display screen by the preset offset distance. In this case, because the motion amplitude of the display screen is excessively large and exceeds the reasonable range, the predicted offset distance obtained through calculation is greater than the preset offset distance. If the screen content is still offset by the predicted offset distance, a part of useful information cannot be displayed due to excessive offset of the screen content. Therefore, the second offset execution module 806d may be configured to offset the screen content in the opposite direction of the motion direction of the display screen by the preset offset distance, which thereby can not only relieve, to some extent, that the screen content cannot be identified due to the motion of the display screen, but can also display complete screen content to the greatest extent.

According to various embodiments, a predicted offset distance is calculated, a relationship between values of the predicted offset distance and a preset offset distance is determined, and different offset distances are used according to a determining result, to offset screen content, so that an offset distance of the screen content maintains within a reasonable range, which can not only ensure that complete screen content is displayed, but can also enable a user to identify the screen content.

Figure 11:
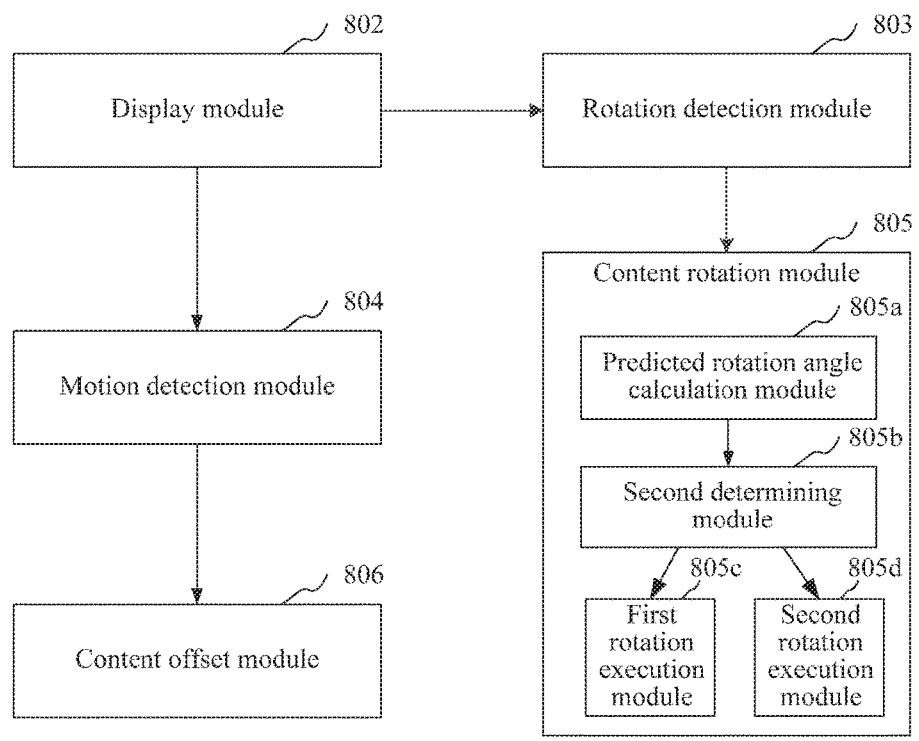
FIG. 11 is a block diagram of a screen content display system according to various embodiments.

As shown in FIG. 11, according to various embodiments, the screen content display system further includes a rotation detection module 803 and a content rotation module 805. The rotation detection module 803 is configured to detect a rotation direction and a rotation angle of the display screen on the plane parallel to the display screen. The content rotation module 805 is configured to rotate the screen content in an opposite direction of the rotation direction of the display screen according to the rotation angle of the display screen. The content rotation module 805 is configured to instantly rotate the whole screen content to the opposite direction of the rotation direction of the display screen, where a rotation center of the screen content corresponds to a rotation center of the display screen, and a rotation angle of the screen content is related to the rotation angle of the display screen. After a terminal rotates the screen content, a part, which exceeds a display area of the display screen, in the rotated screen content is not displayed, and an extra part, which is generated due to rotation, in the rotated screen content may be compensated by using a preset color, a color related to the screen content, or an image related to the screen content.

According to various embodiments, the rotation angle of the screen content is equal to the rotation angle of the display screen. In various embodiments, the screen content is rotated in the opposite direction of the rotation direction of the display screen, and the rotation angle of the content is equal to the rotation angle of the display screen, which can offset motion of the display screen, so that screen content seen by human eyes is static, and human eyes can conveniently identify the screen content.

According to various embodiments, a rotation direction and a rotation angle of a display screen on a plane parallel to the display screen are detected, and screen content is rotated in an opposite direction of the rotation direction of the display screen according to the rotation angle of the display screen, which thereby relieves and even offsets rotation of the screen content caused by rotation of the display screen itself, so that screen content seen by human eyes basically maintains at a fixed location, and human eyes can accurately identify the screen content.

According to various embodiments, the content rotation module 805 includes a predicted rotation angle calculation module 805a, a second determining module 805b, a first rotation execution module 805c, and a second rotation execution module 805d. The predicted rotation angle calculation module 805a is configured to calculate a predicted rotation angle of the screen content according to the rotation angle of the display screen. The predicted rotation angle calculation module 805a may be configured to calculate a product of the rotation angle of the display screen and a preset proportionality coefficient, and use the product as the predicted rotation angle of the screen content, or may directly use the rotation angle of the screen content as the predicted rotation angle of the screen content. The predicted rotation angle refers to an angle that is obtained through calculation and at which the screen content should be rotated to relieve or offset sway of the screen content caused by motion of the display screen.

The second determining module 805b is configured to determine whether the predicted rotation angle is less than or equal to a preset rotation angle. When the rotation angle of the display screen is excessively large, if the screen content is still rotated at the predicted rotation angle, a part of useful information cannot be displayed due to excessive rotation of the screen content. Therefore, the second determining module 805b may be configured to pre-store the preset rotation angle as a threshold, and then configured to perform different operations by determining whether the predicted rotation angle exceeds the threshold, namely, the preset rotation angle.

The first rotation execution module 805c is configured to, if the predicted rotation angle is less than or equal to the preset rotation angle, rotate the screen content in the opposite direction of the motion direction of the display screen at the predicted rotation angle. In this case, because the rotation angle of the display screen is within a reasonable range, the predicted rotation angle obtained through calculation is less than or equal to the preset rotation angle, and the first rotation execution module 805c may be configured to directly offset the screen content in the opposite direction of the rotation direction of the display screen at the predicted rotation angle, so as to effectively relieve or offset that the screen content cannot be identified due to the motion of the display screen.

The second rotation execution module 805d is configured to, if the predicted rotation angle is greater than the preset rotation angle, rotate the screen content in the opposite direction of the motion direction of the display screen at the preset rotation angle. In this case, because the rotation angle of the display screen is excessively large and exceeds the reasonable range, the predicted rotation angle obtained through calculation is greater than the preset rotation angle. If the screen content is still offset at the predicted rotation angle, a part of useful information cannot be displayed due to excessive rotation of the screen content. Therefore, the second rotation execution module 805d may be configured to rotate the screen content in the opposite direction of the rotation direction of the display screen at the preset rotation angle, which thereby can not only relieve, to some extent, that the screen content cannot be identified due to the rotation of the display screen, but can also display complete screen content to the greatest extent.

According to various embodiments, a predicted rotation angle is calculated, a relationship between values of the predicted rotation angle and a preset rotation angle is determined, and different rotation angles are used according to a determining result, to rotate screen content, so that a rotation angle of the screen content maintains within a reasonable range, which can not only ensure that complete screen content is displayed, but can also enable a user to identify the screen content.

Figure 12:
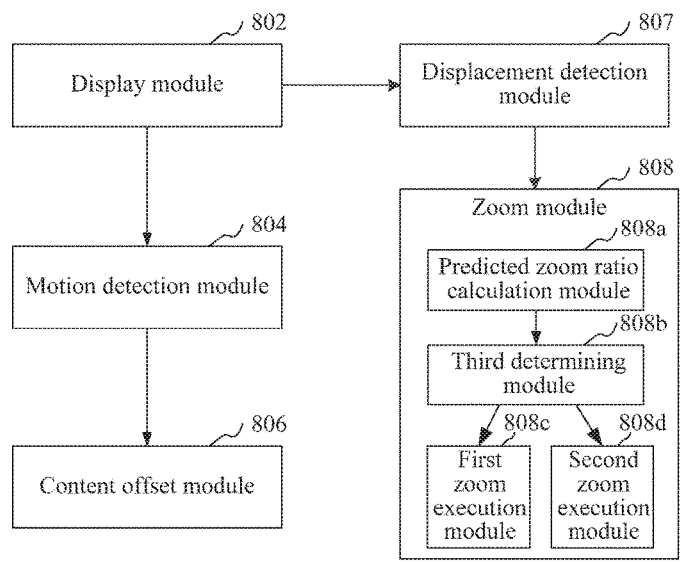
FIG. 12 is a block diagram of a screen content display system according to various embodiments.

As shown in FIG. 12, according to various embodiments, the screen content display system further includes a displacement detection module 807 and a zoom module 808. The displacement detection module 807 is configured to detect a displacement direction and a displacement amplitude of the display screen in a direction perpendicular to the display screen.

The displacement direction (hereinafter briefly referred to as "a longitudinal direction") of the display screen in the direction perpendicular to the display screen includes a displacement of the display screen along a direction that is perpendicular to the display screen and is the same as a light emitting direction of the display screen, or a displacement of the display screen along a direction that is perpendicular to the display screen and is an opposite direction of a light emitting direction of the display screen. The displacement amplitude is a displacement amplitude of the display screen along the displacement direction in the direction perpendicular to the display screen.

The zoom module 808 is configured to zoom out of or zoom in on the screen content according to the displacement direction and the displacement amplitude of the display screen. When the display screen makes a displacement along the direction (that is, a direction towards a user) that is perpendicular to the display screen and is the same as the light emitting direction of the display screen, the zoom module 808 may be configured to zoom out of the screen content. On the contrary, when the display screen makes a displacement along the direction (that is, a direction away from the user) that is perpendicular to the display screen and is opposite to the light emitting direction of the display screen, the zoom module 808 may be configured to zoom in on the screen content. When the display screen stops making a displacement in the direction perpendicular to the display screen, the screen content that is zoomed out of or zoomed in on can be recovered to an original ratio.

According to various embodiments, screen content is zoomed out of or zoomed in on according to a longitudinal displacement direction and displacement amplitude of a display screen, so as to ensure that a size of screen content seen by human eyes basically remains unchanged when the display screen makes a longitudinal displacement, thereby avoiding instability of a size of the screen content caused by repeated longitudinal displacements of the display screen.

According to various embodiments, the zoom module 808 includes a predicted zoom ratio calculation module 808*a*, a third determining module 808*b*, a first zoom execution module 808*c*, and a second zoom execution module 808*d*.

The predicted zoom ratio calculation module 808*a* is configured to calculate a predicted zoom ratio of the screen content according to the displacement direction and the displacement amplitude of the display screen. The predicted zoom ratio calculation module 808*a* may be configured to determine the predicted zoom ratio of the screen content according to a preset correspondence among the displacement direction and displacement amplitude of the display screen and a zoom ratio of the screen content. The predicted zoom ratio refers to a ratio at which the screen content should be zoomed in on or zoomed out of to relieve or offset a size change of the screen content caused by the longitudinal displacement of the display screen.

The third determining module 808*b* is configured to determine whether the predicted zoom ratio is less than or equal to a preset zoom ratio. When the longitudinal displacement of the display screen is excessively large, if the screen content is still zoomed out of or zoomed in on according to the predicted zoom ratio, a zoom ratio of the screen content is imbalanced, so that zoom out of or zoom in on the screen content exceeds a reasonable range, and useful information cannot be displayed. Therefore, the third determining module 808*b* may be configured to pre-store the preset zoom ratio as a threshold, and further configured to perform different operations by determining whether the predicted zoom ratio exceeds the threshold, namely, the preset zoom ratio.

The first zoom execution module 808*c* is configured to, if the predicted zoom ratio is less than or equal to the preset zoom ratio, zoom out of or zoom in on the screen content according to the predicted zoom ratio. In this case, the predicted zoom ratio is less than or equal to the preset zoom ratio, indicating that the predicted zoom ratio is within the reasonable range, and the first zoom execution module 808*c* may be configured to zoom out of or zoom in on the whole screen content according to the predicted zoom ratio. The second zoom execution module 808*d* is configured to, if the predicted zoom ratio is greater than the preset zoom ratio, zoom out of or zoom in on the screen content according to the preset zoom ratio. In this case, the predicted zoom ratio is greater than the preset zoom ratio, indicating that the predicted zoom ratio exceeds the reasonable range, and the second zoom execution module 808*d* may be configured to zoom out of or zoom in on the whole screen content according to the preset zoom ratio.

According to various embodiments, a predicted zoom ratio of screen content is calculated, and a relationship between values of the predicted zoom ratio and a preset zoom ratio is determined, and different zoom ratios are used according to a determining result, to zoom out or zoom in the screen content, so that a zoom ratio of the screen content maintains within a reasonable range, which can not only ensure that complete screen content is displayed, but can also avoid instability of a size of the screen content due to repeated longitudinal displacements of a display screen.

Figure 13:
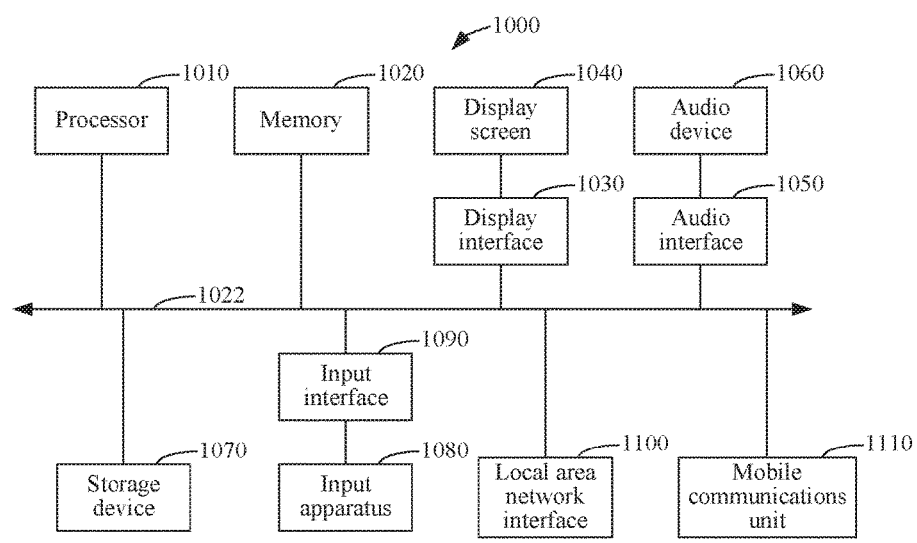
FIG. 13 is a block diagram of a computer system that can implement embodiments of the present disclosure according to various embodiments.

FIG. 13 is a block diagram of a computer system 1000 that can implement the various embodiments of the present disclosure. The computer system 1000 is merely an example of computer environments applicable to the present disclosure, and should not be construed as any limitation on the application scope of the present disclosure. The computer system 1000 also should not be interpreted as needing to rely on or have one or a combination of parts of the exemplary computer system 1000 shown in FIG. 13.

The computer system 1000 shown in FIG. 13 is an example of computer systems suitable for use in the present disclosure. Other architectures having different subsystem configurations may also be used. For example, well-known similar devices such as a desktop computer, a notebook computer, a personal digital assistant, a smart phone, a tablet computer, a portable media player are applicable to various embodiments of the present disclosure, but the present disclosure is not limited thereto.

As shown in FIG. 13, the computer system 1000 includes a processor 1010, a memory 1020, and a system bus 1022. Various system components including the memory 1020 and the processor 1010 are connected to the system bus 1022. The processor 1010 is hardware for executing computer program instructions by means of basic arithmetic and logic operations in the computer system. The memory 1020 is a physical device for temporarily or permanently storing computer programs or data (for example, program state information). The system bus 1022 may be any one of the following types of bus structures: a memory bus or memory controller, a peripheral bus and a local bus. The processor 1010 and the memory 1020 can perform data communication through the system bus 1022. The memory 1020 includes a read-only memory (ROM) or a flash memory (both not shown), and a random access memory (RAM), where the RAM generally refers to a main memory loaded with an operating system and application programs.

The computer system 1000 further includes a display interface 1030 (for example, a graphics processing unit), a display screen 1040, an audio interface 1050 (for example, a sound card), and an audio device 1060 (for example, a loudspeaker). The display screen 1040 and the audio device 1060 are media devices for presenting multimedia content.

The computer system 1000 generally includes one storage device 1070. The storage device 1070 may be selected from multiple types of computer readable media. The computer readable media refer to any available media that can be accessed by the computer system 1000, and include removable media and non-removable media. For example, the computer readable media include, but are not limited to, a flash memory (micro SD card), a CD-ROM, a digital versatile disc (DVD) or other optical storage, a cassette, a magnetic tape, a disk storage or other magnetic storage devices, or any other media that can be used to store desired-information and can be accessed by the computer system 1000.

The computer system 1000 further includes an input apparatus 1080 and an input interface 1090 (for example, an IO controller). A user may input an instruction and information into the computer system 1000 by using the input apparatus 1080, such as a keyboard, a mouse or a touch panel device on the display screen 1040. The input apparatus 1080 is generally connected to the system bus 1022 through the input interface 1090, but may also be connected through other interfaces or bus structures, such as a universal serial bus (USB).

The computer system 1000 may be logically connected to one or more network devices in a network environment. The network device may be a personal computer, a server, a router, a smart phone, a tablet computer, or other public network nodes. The computer system 1000 is connected to the network device through a local area network (LAN) interface 1100 or a mobile communications unit 1110. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 1000 to exchange data or to be connected to a wireless network through radio waves. The mobile communications unit 1110 is capable of making and receiving calls through radio communications lines while moving in a broad geographic area. In addition to calling, the mobile communications unit 1110 also supports Internet access in a 2G, 3G or 4G cellular communications system that provides mobile data services.

The computer system 1000 may further include an accelerometer for measuring acceleration, where the accelerometer may be an acceleration sensor, a gravity sensor, or a gyroscope. Acceleration data may be acquired by using the accelerometer, and a motion direction of the computer system 1000 and the display screen 1040 on a plane parallel to the display screen 1040 and a motion amplitude along the motion direction, and/or a displacement direction and a displacement amplitude in a direction perpendicular to the display screen 1040, and/or a rotation direction and a rotation angle on a plane parallel to the display screen 1040 are then determined according to the acceleration data.

It should be noted that other computer systems including more or fewer subsystems than those of the computer system 1000 are also applicable to the present disclosure. For example, the computer system 1000 may include a Bluetooth unit capable of exchanging data in a short distance, an image sensor for capturing images, and the like.

As described above in detail, the computer system 1000 applicable to the present disclosure can execute specified operations in the screen content display method. The computer system 1000 executes these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 to execute the screen content display method. Moreover, the present disclosure may also be implemented by using a hardware circuit or by using a combination of a hardware circuit and software instructions. Therefore, the implementation of the present disclosure is not limited to any particular combination of a hardware circuit and software.

The foregoing embodiments describe several implementation manners of the present disclosure, and their description should not be considered a limitation to the patent scope of the present disclosure. It should be noted that, a person of ordinary skill in the art may further make variations and improvements without departing from the conception of the present disclosure, and these all fall within the protection scope of the present disclosure. Therefore, the patent protection scope of the present disclosure should be subject to the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A screen content display method, comprising:
displaying screen content by using a display screen;
detecting a motion direction of the display screen on a plane parallel to the display screen and a motion amplitude along the motion direction; and
offsetting the screen content in an opposite direction of the motion direction of the display screen according to the motion amplitude of the display screen;
wherein the offsetting the screen content includes:
calculating a predicted offset distance of the screen content according to the motion amplitude of the display screen;
determining whether the predicted offset distance is less than or equal to a preset offset distance;
if the predicted offset distance is less than or equal to the preset offset distance, offsetting the screen content in the opposite direction of the motion direction of the display screen by the predicted offset distance: and
if the predicted offset distance is greater than the preset offset distance, offsetting the screen content in the opposite direction of the motion direction of the display screen by the preset offset distance.

2. The method according to claim 1, wherein the detecting a motion direction of the display screen on a plane parallel to the display screen and a motion amplitude along the motion direction comprises:
collecting acceleration data of the display screen by using a sensor; and
determining the motion direction of the display screen on the plane parallel to the display screen and the motion amplitude along the motion direction according to the acceleration data.

3. The method according to claim 1, wherein the method further comprises:
  detecting a rotation direction and a rotation angle of the display screen on the plane parallel to the display screen; and
  rotating the screen content in an opposite direction of the rotation direction of the display screen according to the rotation angle of the display screen.

4. The method according to claim 3, wherein the rotating the screen content in an opposite direction of the rotation direction of the display screen according to the rotation angle of the display screen comprises:
  calculating a predicted rotation angle of the screen content according to the rotation angle of the display screen;
  determining whether the predicted rotation angle is less than or equal to a preset rotation angle;
  if the predicted rotation angle is less than or equal to the preset rotation angle, rotating the screen content in the opposite direction of the motion direction of the display screen at the predicted rotation angle; and
  if the predicted rotation angle is greater than the preset rotation angle, rotating the screen content in the opposite direction of the motion direction of the display screen at the preset rotation angle.

5. The method according to claim 1, wherein the method further comprises:
  detecting a displacement direction and a displacement amplitude of the display screen in a direction perpendicular to the display screen; and
  zooming out or zooming in the screen content according to the displacement direction and the displacement amplitude of the display screen.

6. The method according to claim 5, wherein the zooming out or zooming in the screen content according to the displacement direction and the displacement amplitude of the display screen comprises:
  calculating a predicted zoom ratio of the screen content according to the displacement direction and the displacement amplitude of the display screen;
  determining whether the predicted zoom ratio is less than or equal to a preset zoom ratio;
  if the predicted zoom ratio is less than or equal to the preset zoom ratio, zooming out or zooming in the screen content according to the predicted zoom ratio; and
  if the predicted zoom ratio is greater than the preset zoom ratio, zooming out or zooming in the screen content according to the preset zoom ratio.

7. A screen content display system, comprising:
  a display module, configured to display screen content by using a display screen;
  a motion detection module, configured to detect a motion direction of the display screen on a plane parallel to the display screen and a motion amplitude along the motion direction; and
  a content offset module, configured to offset the screen content in an opposite direction of the motion direction of the display screen according to the motion amplitude of the display screen;
  wherein the content offset module includes:
  a predicted offset distance calculation module, configured to calculate a predicted offset distance of the screen content according to the motion amplitude of the display screen;
  a first determining module, configured to determine whether the predicted offset distance is less than or equal to a preset offset distance;
  a first offset execution module, configured to: if the predicted offset distance is less than or equal to the preset offset distance, offset the screen content in the opposite direction of the motion direction of the display screen by the predicted offset distance; and
  a second offset execution module, configured to: if the predicted offset distance is greater than the preset offset distance, offset the screen content in the opposite direction of the motion direction of the display screen by the preset offset distance.

8. The system according to claim 7, wherein the motion detection module comprises:
  an acceleration data acquisition module, configured to collect acceleration data of the display screen by using a sensor; and
  a motion direction and motion amplitude determining module, configured to determine the motion direction of the display screen on the plane parallel to the display screen and the motion amplitude along the motion direction according to the acceleration data.

9. The system according to claim 7, wherein the system further comprises:
  a rotation detection module, configured to detect a rotation direction and a rotation angle of the display screen on the plane parallel to the display screen; and
  a content rotation module, configured to rotate the screen content in an opposite direction of the rotation direction of the display screen according to the rotation angle of the display screen.

10. The system according to claim 9, wherein the content rotation module comprises:
  a predicted rotation angle calculation module, configured to calculate a predicted rotation angle of the screen content according to the rotation angle of the display screen;
  a second determining module, configured to determine whether the predicted rotation angle is less than or equal to a preset rotation angle;
  a first rotation execution module, configured to: if the predicted rotation angle is less than or equal to the preset rotation angle, rotate the screen content in the opposite direction of the motion direction of the display screen at the predicted rotation angle; and
  a second rotation execution module, configured to: if the predicted rotation angle is greater than the preset rotation angle, rotate the screen content in the opposite direction of the motion direction of the display screen at the preset rotation angle.

11. The system according to claim 7, wherein the system further comprises:
  a displacement detection module, configured to detect a displacement direction and a displacement amplitude of the display screen in a direction perpendicular to the display screen; and
  a zoom module, configured to zoom out or zoom in the screen content according to the displacement direction and the displacement amplitude of the display screen.

12. The system according to claim 11, wherein the zoom module comprises:
  a predicted zoom ratio calculation module, configured to calculate a predicted zoom ratio of the screen content according to the displacement direction and the displacement amplitude of the display screen;
  a third determining module, configured to determine whether the predicted zoom ratio is less than or equal to a preset zoom ratio;

a first zoom execution module, configured to: if the predicted zoom ratio is less than or equal to the preset zoom ratio, zoom out or zoom in the screen content according to the predicted zoom ratio; and a second zoom execution module, configured to: if the predicted zoom ratio is greater than the preset zoom ratio, zoom out or zoom in the screen content according to the preset zoom ratio.

13. A non-transitory computer-readable medium storing instructions which, when executed by one or more processors, to:

display screen content by using a display screen;

detect a motion direction of the display screen on a plane parallel to the display screen and a motion amplitude along the motion direction; and offset the screen content in an opposite direction of the motion direction of the display screen according to the motion amplitude of the display screen;

wherein the offset the screen content includes:

calculating a predicted offset distance of the screen content according to the motion amplitude of the display screen;

determining whether the predicted offset distance is less than or equal to a preset offset distance;

if the predicted offset distance is less than or equal to the preset offset distance, offsetting the screen content in the opposite direction of the motion direction of the display screen by the predicted offset distance; and if the predicted offset distance is greater than the preset offset distance, offsetting the screen content in the opposite direction of the motion direction of the display screen by the preset offset distance.

* * * * *